United States Patent
Meyer

[11] 3,872,094
[45] Mar. 18, 1975

[54] BIS-AROXAZOLYL COMPOUNDS, PROCESSES FOR THEIR MANUFACTURE AND THEIR USE

[75] Inventor: Hans-Rudolf Meyer, Basel, Switzerland

[73] Assignee: Ciba-Geigy AG, Basel, Switzerland

[22] Filed: Dec. 16, 1970

[21] Appl. No.: 98,869

[30] Foreign Application Priority Data
Dec. 17, 1969  Switzerland.................. 18853/69

[52] U.S. Cl... 260/307 D, 252/301.2 W, 260/247.1, 260/247.2 R, 260/247.2 A, 260/247.2 B, 260/247.5 R, 260/247.5 B, 260/308 R, 260/308 A, 260/330.5, 260/332.1, 260/346.2 M, 260/559 A, 260/559 T, 260/575, 260/578
[51] Int. Cl............................... C07d 85/48
[58] Field of Search ..................... 260/307 D

[56] References Cited
UNITED STATES PATENTS
2,959,589  11/1960  Ramsden .................. 260/251

Primary Examiner—Donald G. Daus
Assistant Examiner—Raymond V. Rush
Attorney, Agent, or Firm—Joseph G. Kolodny; Edward McC. Roberts; Prabodh I. Almaula

[57] ABSTRACT

Bis-aroxazolyl compounds of the formula

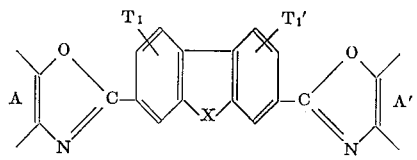

wherein X represents a bridge member —O—, —S— or —SO$_2$—, T$_1$ and T$_1$' denote hydrogen, a lower alkyl group, lower alkoxy group, halogen or a sulphone group or their functional derivatives, and A and A' denote a benzene ring which can contain 1 to 4 non-chromophoric substituents, a tetrahydronaphthalene ring or naphthalene ring, which can carry sulphonic acid groups or alkyl or alkoxy groups, or a hydrindene ring. These compounds are useful as optical brightening agents.

9 Claims, No Drawings

BIS-AROXAZOLYL COMPOUNDS, PROCESSES FOR THEIR MANUFACTURE AND THEIR USE

The present invention relates to new bis-aroxazolyl compounds, processes for the manufacture of these compounds, and their use as optical brighteners for organic materials.

The new bis-aroxazolyl compounds correspond to the general formula (1) 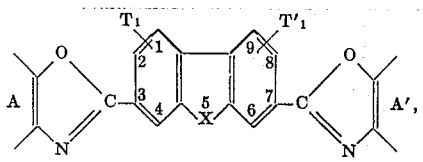

wherein X represents a bridge member $-O-$, $-S-$ or $-SO_2-$, $T_1$ and $T_1'$ denote hydrogen, a lower alkyl group, lower alkoxy group, halogen or a sulpho group or their functional derivatives, and A and A' denote a benzene ring which can contain 1 to 4 non-chromophoric substituents, a tetrahydronaphthalene ring or naphthalene ring, which can carry sulphonic acid groups or alkyl or alkoxy groups, or a hydrindene ring.

Possible positions for the substituents $T_1$ and/or $T_1'$ are here preferably the positions 2,8. The term sulphonic acid group is intended to encompass, in addition to the $-SO_3H$ group and its salts, also the functional derivatives of the sulphonic acid group.

From amongst the large number of non-chromophoric substituents, halogen, alkyl groups, cycloalkyl groups, aralkyl groups, phenyl groups, hydroxyl groups, amino groups, carboxyl groups, sulphonic acid groups and their substitutive and functional derivatives may be mentioned by way of examples, as being of predominant interest for practical purposes.

By the terms substitutive derivatives and functional derivatives there are to be understood those substituents which can be substitutively or functionally derived directly from the above-mentioned basic types of substituents. Accordingly, the following are for example to be described as substitutive derivatives of alkyl groups: halogenalkyl, hydroxyalkyl, cyanoalkyl, carboxyalkyl, carbalkoxyalkyl and sulphonyl alkyl groups and the like; of phenyl groups, the alkylphenyl, halogenophenyl, alkoxyphenyl and carboxyphenyl groups, sulphonated phenyl groups and the like; in the case or aralkyl groups, also those derivative groups in which the aryl part contains further substituents. As examples of functional derivatives of carboxyl groups there may be mentioned: carboxylic acid ester, carboxylic acid amide, carboxylic acid nitrile and similar groups; in the case of sulpho groups, the sulphonic acid ester, sulphonic acid amide, alkylsulphone and arylsulphone groups; in the case of hydroxyl groups, the alkoxy groups, phenoxy groups and hydroxyalkoxy groups: in the case of amino groups, the monoalkylated and dialkylated, quaternised, arylated and acylated amino groups (morpholide groups), urethane and urea derivatives, triazinyl derivatives and the like, provided they fulfill the condition of being of non-chromophoric character.

Where carboxyl groups and sulphonic acid groups are mentioned within the framework of the present invention, the salts of these groups are always to be understood as being also encompassed thereby. Possible salts are preferably the alkali, alkaline earth, ammonium and amine salts.

From a practical point of view, those compounds within the framework of the definition according to formula (1) are of interest which correspond to the formulae (2) and (3) given below:

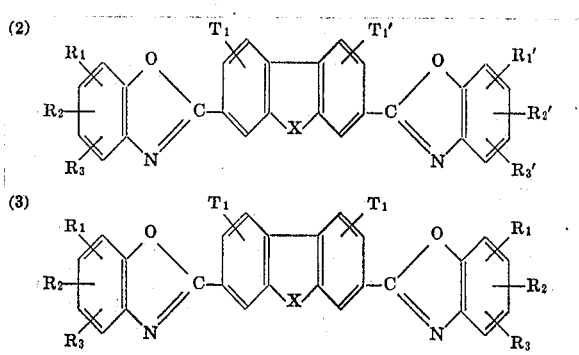

Compounds of the formula (2) can be of either asymmetrical or symmetrical structure, and in this formula X represents a bridge member $-O-$, $-S-$, or $-SO_2-$, $R_1$ and $R_1'$ denote hydrogen, alkyl with 1 to 12 carbon atoms, halogen, cyclohexyl, phenylalkyl with 1 to 4 carbon atoms in the alkyl part, phenyl, sulphophenyl, phenylsulphonyl, alkylsulphonyl with 1 to 4 carbon atoms, alkoxy with 1 to 4 carbon atoms, phenoxy, halogeno(Cl, F)-methyl, carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and also carbonamide-alkyl, substituted carbonamide-alkyl and carboxylic acid ester alkyl, such as for example carbomethoxyethyl, in each case with a substituent containing 1 to 18 carbon atoms, sulphonic acid, sulphonic acid amide, substituted sulphonic acid amide and sulphonic acid ester, in each case with a substituent containing 1 to 18 carbon atoms, or nitrile, $R_2$ and $R_2'$ denote hydrogen, an alkyl group with 1 to 5 carbon atoms, chlorine or an alkoxy group with 1 to 4 carbon atoms, $R_3$ and $R_3'$ denote hydrogen, an alkyl group with 1 to 4 carbon atoms, chlorine or an alkoxy group with 1 to 4 carbon atoms, and furthermore $R_1$ together with $R_2$ and/or $R_1'$ together with $R_2'$ can form a fused 5-membered or 6-membered, cycloaliphatic carbon ring or a fused benzene ring, and the hydrindene, naphthalene or tetrahydronaphthalene ring systems thereby formed can additionally contain sulphonic acid groups, preferably 1 to 2 thereof, and their functional derivatives, as substituents, and $T_1$ and $T_1'$ denote hydrogen, a lower alkyl group, a lower alkoxy group, halogen or a sulpho group, and their functional derivatives.

Further interesting sub-groups of compounds within the framework of formula (1) correspond to the following formulae: α) Dibenzofurane derivatives of formula (4) 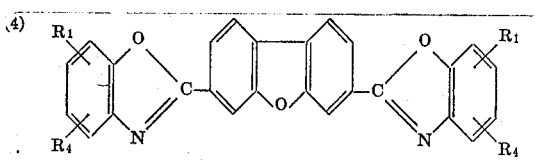

wherein $R_1$ denotes hydrogen, alkyl with 1 to 12 carbon atoms, halogen, cyclohexyl, phenylalkyl with 1 to 4 carbon atoms in the alkyl part, phenyl, sulphophenyl, phenylsulphonyl, alkylsulphonyl with 1 to 4 carbon atoms, alkoxy with 1 to 4 carbon atoms, phenoxy, halogeno(Cl,F)-methyl carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and carbonamide-alkyl, substituted carbonamide-alkyl and carboxylic acid ester alkyl, in each case with a substituent containing 1 to 18 carbon atoms, sulphonic acid, sulphonic acid amide, substituted sulphonic acid amide and sulphonic acid ester, in each case with a substituent containing 1 to 18 carbon atoms, or nitrile, $R_4$ denotes hydrogen, alkyl with 1 to 5 carbon atoms or chlorine and $R_1$ together with $R_4$ can form a fused 6-membered, cycloaliphatic carbon ring or benzene ring, and the naphthalene or tetrahydronaphthalene ring systems thereby formed can additionally contain sulphonic acid groups, preferably 1 to 2 thereof, and their functional derivatives, as substituents. β) Dibenzofurane derivatives of formula (5) 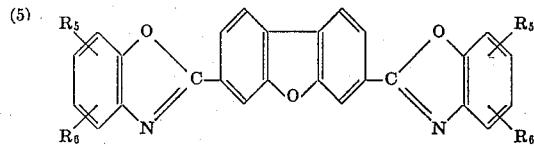

wherein $R_5$ denotes hydrogen, alkyl with 1 to 12 carbon atoms, cyclohexyl, chlorine, phenylalkyl with 1 to 4 carbon atoms in the alkyl part, phenyl, alkoxy with 1 to 4 carbon atoms, carboxylic acid amide, carboxylic acid alkylamide with 1 to 12 carbon atoms or carboxylic acid morpholide, carboxyl, carboxylic acid alkyl ester with 1 to 12 carbon atoms, sulphonic acid, sulphonic acid amide, sulphonalkylamide with 1 to 12 carbon atoms or sulphonic acid alkyl ester with 1 to 12 carbon atoms, nitrile, phenylsulphonyl or alkylsulphonyl with 1 to 4 carbon atoms in the alkyl part, and $R_6$ denotes hydrogen, an alkyl group with 1 to 5 carbon atoms or chlorine. γ) Bis-naphthoxazolyldibenzofuranes and compounds related thereto, according to formula (6) 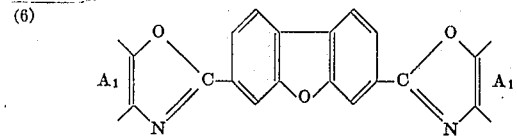

wherein $A_1$ represents a naphthalene ring, tetrahydronaphthalene ring or hydrindene ring, and wherein naphthalene rings can additionally contain 1 to 2 sulpho groups, and their amides or esters, as substituents. δ) Dibenzo-thiophenedioxide derivatives of the formula (7) 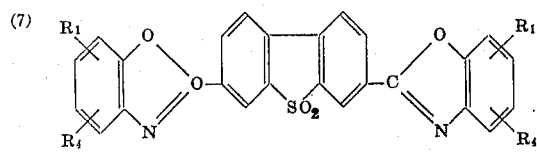

wherein $R_1$ denotes hydrogen, alkyl with 1 to 12 carbon atoms, halogen, cyclohexyl, phenylalkyl with 1 to 4 carbon atoms in the alkyl part, phenyl, phenylsulphonyl, alkylsulphonyl with 1 to 4 carbon atoms, alkoxy with 1 to 4 carbon atoms, phenoxy, halogeno(Cl,F)-methyl, carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and carbonamide-alkyl, substituted carbonamide-alkyl and carboxylic acid ester alkyl, in each case with a substituent containing 1 to 18 carbon atoms, sulphonic acid, sulphonic acid amide, substituted sulphonic acid amide and sulphonic acid ester, in each case with a substituent containing 1 to 18 carbon atoms, or nitrile, and $R_4$ denotes hydrogen, alkyl with 1 to 5 carbon atoms or chlorine.

Compounds of preferred importance, above all from the point of view of application, are those according to formula (1) which are, on the one hand, derived from dibenzofurane or dibenzothiophene-dioxide and on the other hand contain up to two substituents from special groups of substituents in each benzoxazolyl radical. Such compounds correspond to the following general formulae: a) Symmetrical compounds of the formula (8) 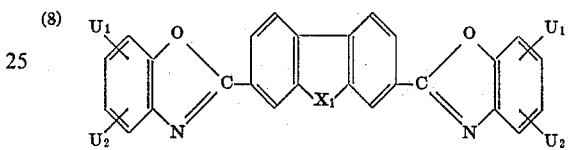

wherein $X_1$ represents a bridge member —O— or —SO$_2$—, $U_1$ denotes hydrogen, alkyl with 1 to 12 carbon atoms, chlorine, cyclohexyl, phenylalkyl with 1 to 4 carbon atoms in the alkyl part, cyanoethyl, phenyl, alkylsulphonyl with 1 to 4 carbon atoms, alkoxy with 1 to 4 carbon atoms, phenoxy, carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and carbonamide-alkyl, substituted carbonamide-alkyl and carboxylic acid ester alkyl, in each case with a substituent containing 1 to 18 carbon atoms, or nitrile, and $U_2$ denotes hydrogen, an alkyl group with 1 to 5 carbon atoms or chlorine, and wherein furthermore $U_1$ together with $U_2$ can form a fused, five-membered or six-membered, cycloaliphatic carbon ring or a fused benzene ring.

b. Symmetrical compounds of the formula (9) 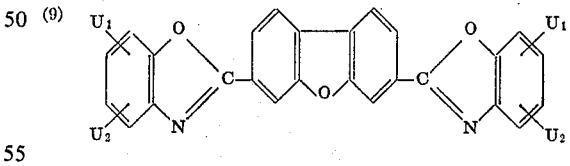

wherein $U_1$ denotes hydrogen, alkyl with 1 to 12 carbon atoms, chlorine, cyclohexyl, phenylalkyl with 1 to 4 carbon atoms in the alkyl part, cyanoethyl, phenyl, alkylsulphonyl with 1 to 4 carbon atoms, alkoxy with 1 to 4 carbon atoms, phenoxy, carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and carboxylic acid ester alkyl, in each case with a substituent containing 1 to 18 carbon atoms, $U_2$ denotes hydrogen, alkyl with 1 to 5 carbon atoms or chlorine, and $U_1$ together with $U_2$ can form a fused five-membered or six-membered, cycloaliphatic carbon ring or benzene ring. c) Symmetrical compounds of the formula

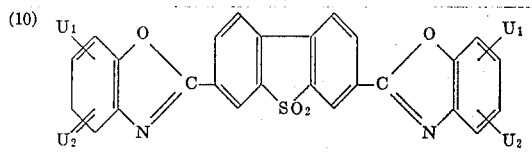

wherein $U_1$ denotes hydrogen, alkyl with 1 to 12 carbon atoms, chlorine, cyclohexyl, phenylalkyl with 1 to 4 carbon atoms in the alkyl part, cyanoethyl, phenyl, alkylsulphonyl with 1 to 4 carbon atoms, alkoxy with 1 to 4 carbon atoms, phenoxy, carboxyl, carboxylic acid amide, substituted carboxylic acid amide and carboxylic acid ester, in each case with a substituent containing 1 to 18 carbon atoms, carboxyalkyl with 1 to 4 carbon atoms in the alkyl part, and carboxylic acid ester alkyl, in each case with a substituent containing 1 to 18 carbon atoms, and $U_2$ denotes hydrogen, alkyl with 1 to 5 carbon atoms or chlorine, and $U_1$ together with $U_2$ can form a fused five-membered or six-membered cycloaliphatic carbon ring or benzene ring. d. Symmetrical compounds of the formula

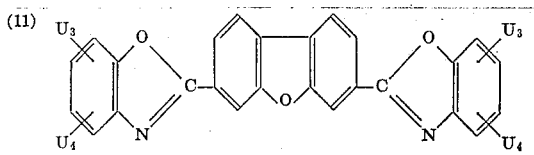

wherein $U_3$ denotes hydrogen, alkyl with 1 to 12 carbon atoms, cyclohexyl, chlorine, phenylalkyl with 1 to 4 carbon atoms in the alkyl part, phenyl, alkoxy with 1 to 4 carbon atoms, carboxyl, carboxylic acid alkyl ester with 1 to 12 carbon atoms or alkylsulphonyl with 1 to 4 carbon atoms in the alkyl part and $U_4$ denotes hydrogen, an alkyl group with 1 to 4 carbon atoms or chlorine. e. Symmetrical compounds of the formula

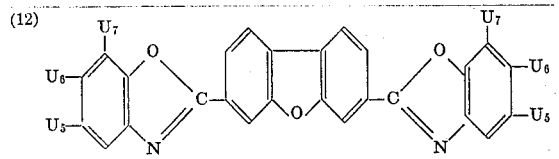

wherein at least one of the symbols $U_7$, $Y_6$ and $U_5$ denotes hydrogen and, as regards the rest, $U_7$ denotes hydrogen, chlorine or alkyl with 1 to 5 carbon atoms, $U_6$ denotes hydrogen, phenoxy or alkyl with 1 to 4 carbon atoms and $U_5$ denotes hydrogen, alkyl with 1 to 12 carbon atoms, cyclohexyl, chlorine, cyanoethyl, alkoxy with 1 to 4 carbon atoms, alkylsulphonyl with 1 to 4 carbon atoms, phenoxy, phenyl, phenylalkyl with 1 to 4 carbon atoms in the alkyl part, carboxyl or carbalkoxy with 1 to 12 carbon atoms in the alkyl part. f. Symmetical compounds of the formula

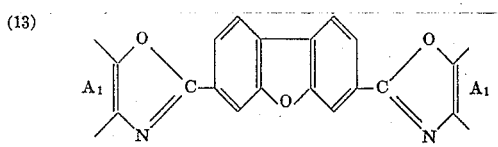

wherein $A_1$ represents a naphthalene ring, tetrahydronaphthalene ring or hydrindene ring. g. Symmetrical compounds of the formula

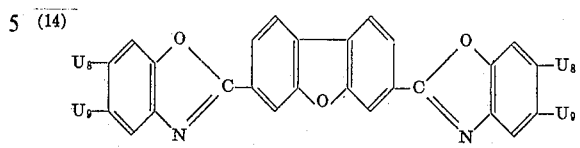

wherein $U_8$ denotes hydrogen, alkyl with 1 to 4 carbon atoms or phenyl and $U_9$ denotes hydrogen or alkyl with 1 to 4 carbon atoms, and, if $U_8$ represents hydrogen, can also denote phenyl or methoxy. h. Compounds of the formula

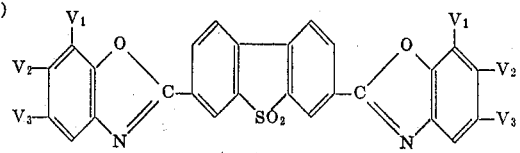

wherein at least one of the symbols $V_1$, $V_2$ and $V_3$ denotes hydrogen and, for the rest, $V_1$ denotes hydrogen, chlorine or alkyl with 1 to 5 carbon atoms, $V_2$ denotes hydrogen, phenoxy or alkyl with 1 to 4 carbon atoms and $V_3$ denotes hydrogen, alkyl with 1 to 12 carbon atoms, cyclohexyl, chlorine, cyanoethyl, alkoxy with 1 to 4 carbon atoms, alkylsulphonyl with 1 to 4 carbon atoms, phenoxy, phenyl, phenylalkyl with 1 to 4 carbon atoms in the alkyl part, carboxyl or carbalkoxy with 1 to 12 carbon atoms in the alkyl part. i. Compounds of the formula

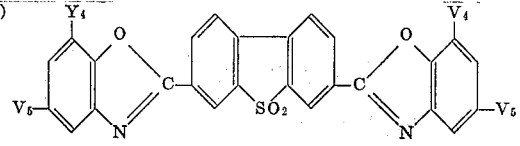

wherein $V_4$ denotes hydrogen or alkyl with 1 to 4 carbon atoms and $V_5$ denotes hydrogen, alkyl with 1 to 12 carbon atoms or phenyl.

The compounds of the formulae

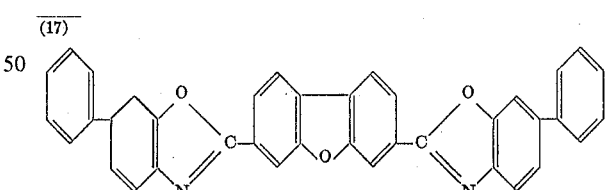

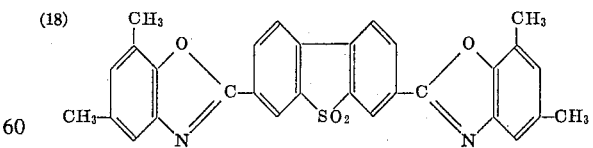

and

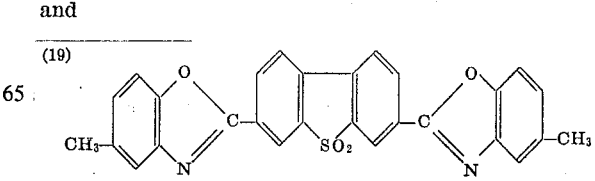

represent particularly valuable brighteners for polyester spinning compositions.

The aroxazole derivatives characterised above can in general be manufactured according to various methods.

A process of very broad applicability is oxazole cyclisation, starting from the corresponding acylamides. In its most general form, this procedure can be defined as compounds of the general formula

(20) 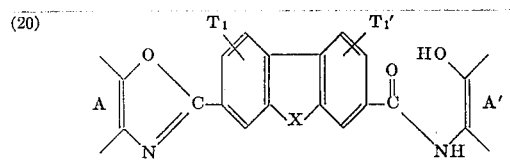

wherein A, A', X, $T_1$ and $T_1'$ have the meaning given under formula (1), being subjected to a cyclisation reaction by heating to temperatures above 100°C, preferably in the presence of agents which split off water.

For the synthesis of symmetrical compounds according to formula (1), that is to say A = A', it is possible to use the corresponding variant, according to which acyl compounds of the formula

(21) 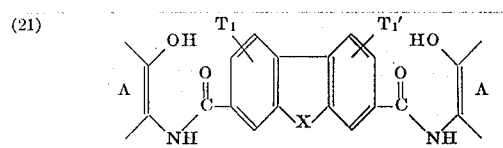

are subjected to the cyclisation reaction by heating to temperatures above 100°C, again preferably in the presence of agents which split off water.

To manufacture the acyl compounds of the formula (20) or (21) required for the process described above, it is possible to use the corresponding dibenzofurane- or -thiophene- or -thiophene-dioxide-dicarboxylic acids or their functional derivatives as the one reactant and the o-aminophenols

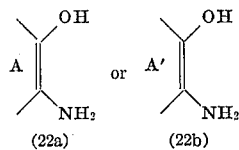

as the other reactant. Here the reaction takes place in accordance with the equation

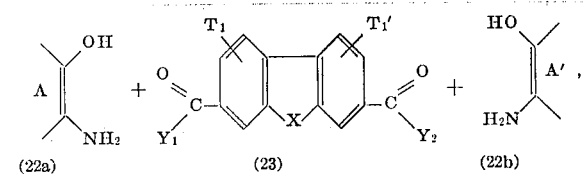

wherein $Y_1$ and $Y_2$ represent a hydroxyl group, a halogen atom, (preferably chlorine) or an alkoxy group (preferably with 1 to 8 carbon atoms). Depending on whether it is intended to manufacture asymmetrical or symmetrical types, one chooses $Y_1 \neq Y_2$ or $Y_1 = Y_2$, and it is desirable that for the case of $Y_1 \neq Y_2$ groups of distinctly different reactivity, for example dibenzofurane-dicarboxylic acid ester chlorides, should be preferred, and that for the case of $Y_1 = Y_2$ compounds which are as reactive as possible, that is to say dibenzofuranedicarboxylic acid dichlorides, should be preferred.

If it is desired to manufacture asymmetrical types, a cyclisation on one side is appropriately first carried out on the primary condensation product

(24) 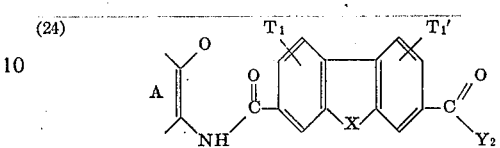

analogously to the manner indicated above, to give compounds of the formula

(25) 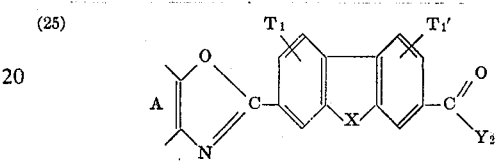

and the analogous reaction sequence is then repeated with the aminophenol (22b)

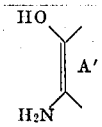

at the remaining carboxyl group

The asymmetrical types are however also obtained by condensing the dicarboxylic acid derivative with mixtures of at least 2 different o-aminophenols, in which case the corresponding symmetrical compounds are then in general produced at the same time. Depending on the end use, these can be separated off, or the mixture can be employed directly.

The synthesis of the compounds according to general formula (1) and of the formula of subordinate compounds can in principle also be carried out in a single-stage process, starting from o-aminophenols of formula (22a) or (22b) and dicarboxylic acid derivatives of formula (23), by heating these components together to higher temperatures, appropriately between 120° and 350°C, in an inert gas (for example a stream of nitrogen). This reaction is preferably carried out similarly in the presence of agents which split off water, as has been described above for the end stage.

Preferably, however, the synthesis of symmetrical compounds is carried out in two stages by first condensing o-aminophenols of the formula (22a) and dicarboxylic acid compounds of the formula (23) to give acyl compounds of the formula (21). Herein, the dicarboxylic acid chlorides are appropriately used; they are condensed with the aminophenols in the presence of an organic solvent such as toluene, xylenes chlorobenzene, dichlorobenzene, trichlorobenzene, chlorinated biphenyl or nitrobenzene, at temperatures of up to 220°C, and the resulting acyl compounds of formula (21) are then converted into the azole rings at temperatures between 120° and 350°C, optionally in the presence of a catalyst. If carboxylic acid chlorides are used as the starting substances, these can be manufactured from the free carboxylic acid and the thionyl chloride immediately prior to the condensation with the o-amino compound, optionally with the addition of a catalyst such as pyridine, in the solvent wherein the condensation subsequently takes place, and can be employed further without isolation.

Suitable agents for splitting off water — including catalysts having the effect of splitting off water — are, for example, boric acid, boric anhydride, zinc chloride, p-toluenesulphonic acids, thionyl chloride, phosphorus oxychloride and also polyphosphoric acids, including pyrophosphoric acid. If boric acid is used as the catalyst, it is advantageously employed in an amount of 0.5 to 5 percent, relative to the total weight of the reaction mass. It is also possible conjointly to use highboiling, polar organic solvents, such as for example dimethylformamide and aliphatic, optionally etherified, hydroxyl compounds, for example propylene glycol, ethylene glycol monoethyl ether or diethylene glycol diethyl ether and high-boiling esters of phthalic acid, such as for example dibutyl phthalate.

A particularly advantageous process for the manufacture of aroxazole derivatives of formula (3) for example, consists in that the acyl compounds obtained by the condensation of 2 mols of o-aminophenols of formula

(26) 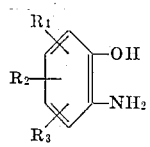

with a dicarboxylic acid of formula

(27) 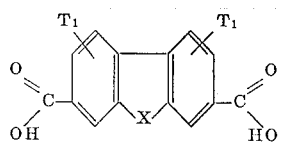

are subjected, in the presence of agents that split off water and without isolation, to an azole cyclisation reaction by treatment with the same agent which splits off water as that used in the preliminary stage, at temperatures of between 120° and 350°C.

An advantageous method of manufacture consists in reacting dinitriles of formula

(28) 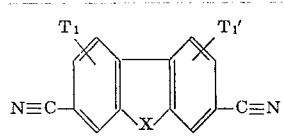

with o-aminophenols of formulae (22a) or (22b) at elevated temperatures, that is to say at temperatures of 100° to 350°C (preferably 160° to 260°C). This reaction is appropriately carried out in the presence of ammonia binding agents, such as for example oxygen-containing acids of pentavalent phosphorus such as those of ortho-phosphoric acid, and in a stream of an inert gas (for example in a stream of nitrogen).

Possible oxygen-containing acids of pentavalent phosphorus are for example: polyphosphoric acid, pyrophosphoric acid and phosphoric acid.

Normally, the reactants are employed in approximately equivalent amounts, and the ammonia binding agents are employed in amounts of 1 equivalent per mol of ammonia to be split off, or above; they can, where appropriate, be employed as solvents. It is possible to carry out the process either in a melt of the components or in the presence of solvents which are chemically inert towards the reactants. Such solvents are, for example, chlorinated aromatic compounds such as trichlorobenzene, dichlorobenzene, chlorinated biphenyl and diethylene glycol dialkyl ethers.

The compounds of the formula (1) having sulphonic acid groups on aromatic rings can also be obtained by post-sulphonation of the corresponding base substances.

The compounds according to formula (8) and subordinate formulae can accordingly be manufactured appropriately by reacting with each other about 2 mol equivalents of aminophenol of the formula

(29) 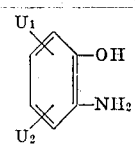

and about 1 mol equivalent of a dicarboxylic acid derivative of the formula

(30) 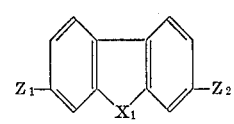

at temperatures between 120° and 350°C, preferably in the presence of condensation agents; in the above formulae $U_1$, $U_2$ and $X_1$ have the above-mentioned meaning and $Z_1$ and $Z_2$ are identical or different and represent a —CN group or

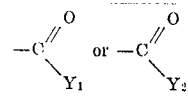

$Y_1$ and/or $Y_2$ having the meanings of hydroxyl group, halogen atom or lower alkoxy group, and oxygen-containing acids of pentavalent phosphorus being employed as condensation agents in the case where $Z_1$ and/or $Z_2$ represent —C ≡ N, whilst if $Z_1$ and/or $Z_2$ represent a group

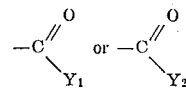

the condensation agents used are generally those which have the effect of splitting off water.

Another method of manufacture of the compounds of formula (1), which is advantageous in many cases, consists in the condensation of o-halogenoanilines with acid derivatives of dibenzothiophene-dioxide or of dibenzofurane in accordance with the equation

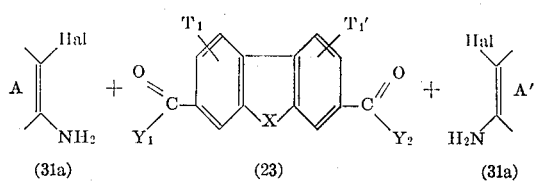

(31a)  (23)  (31a)

by methods which are in themselves known, to give the corresponding acid amide

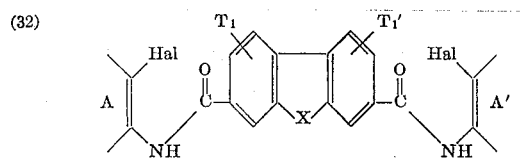

(32)

and subsequent cyclisation to give the corresponding bisbenzoxazolyl derivative. The cyclisation reaction is here carried out in the presence of polar solvents which are chemically inert towards the reactants, and also in the presence of agents which bind hydrogen halide and of copper catalysts. In the preceding formulae, Hal denotes chlorine or bromine, whilst all the remaining symbols have the meaning given earlier.

This method of manufacture proves particularly appropriate for the preparation of symmetrical bis-aroxazolyl compounds of the formula (8) and subordinate formulae.

Accordingly, to prepare compounds of the formula (8), about 2 mol equivalents of a compound of the formula

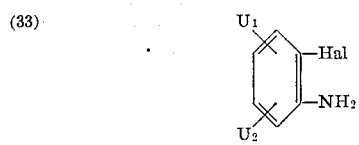

(33)

are condensed with about 1 mol equivalent of a dicarboxylic acid derivative of the formula

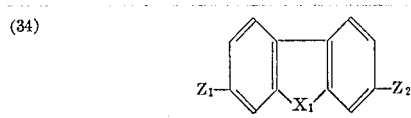

(34)

in a manner which is itself known, to give the acid amide

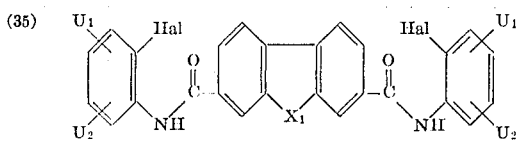

(35)

wherein Hal represents the halogens, chlorine or bromine and $Y_1$ and $Y_2$ represent hydroxyl, halogen or a lower alkyl group. In a second stage, the cyclisation to give the corresponding benzoxazole compounds is carried out in the presence of polar solvents, hydrogen halide binding agents and copper catalysts.

As examples of polar solvents which are chemically inert towards the reactants, dimethylformamide, dimethylsulphoxide, N-methylpyrrolidine or nitrobenzene may be mentioned. Hydrogen halide binding agents are: alkali acetate, magnesium oxide, organic bases such as pyridine and the like. By way of example, cuprous chloride, cupric chloride, copper acetate, copper oxides, elementary finely divided copper and the like may be mentioned as copper catalysts.

An interesting route for the manufacture of dibenzofurane derivatives, for example those according to formula (9) (and appropriately subordinate formulae) consists in condensing about 2 mol equivalents of a compound of the formula

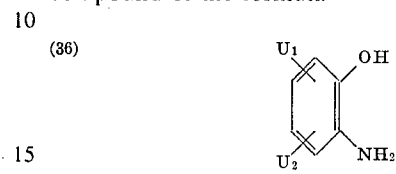

(36)

with about 1 mol equivalent of a compound of the formula

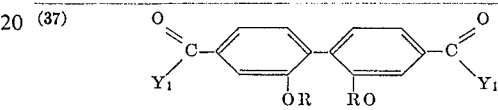

(37)

in a manner which is itself customary, to give an acid amide of the formula

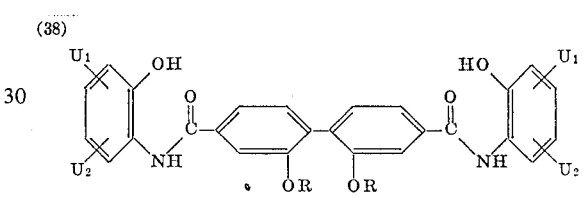

(38)

wherein R represents acetyl, alkyl or preferably hydrogen, and $Y_1$ represents hydroxyl, halogen or a lower alkoxy group. In a second stage, the cyclisation to give the corresponding benzoxazole derivatives is carried out in accordance with procedures which are in themselves customary (compare those above), and the cyclisation to give the dibenzofurane ring is effected either simultaneously with the benzoxazole cyclisation, or in a separate third stage, by heating to temperatures above 250°C, where appropriate under reduced pressure and/or with the use of powerful agents for splitting off water, such as polyphosphoric acid, zinc chloride and the like.

Further possible ways of manufacturing compounds of the formula (1) are based on the following reaction equations:

A. Esterification of

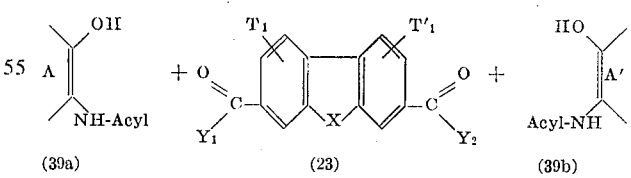

(39a)  (23)  (39b)

to give compounds of the formula

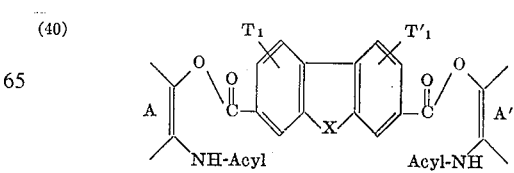

(40)

and subsequent splitting off of acyl-OH by heating to 150° to 250°C in the presence of polyphosphoric acid or zinc chloride, for example in ethylene glycol as the solvent, whereby cyclisation to give compounds of the formula (1) is achieved.

B.) Reaction of

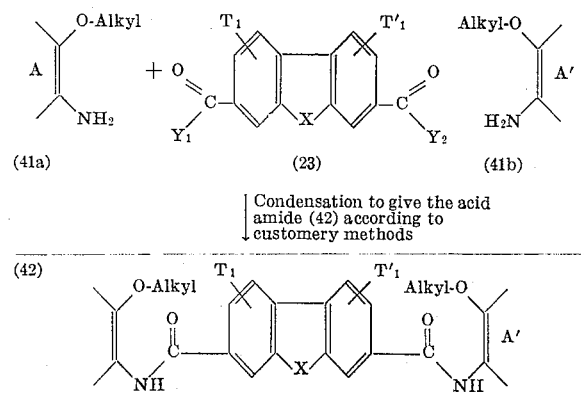

and cyclisation by heating with zinc chloride in the melt or in solution (for example in glycerol, ethylene glycol or small amounts of water at 150° to 250°C) or with polyphosphoric acid, optionally with the addition of alkali iodide, at 150° to 250°C, to give compounds of the formula (1).

The new compounds of the initially described composition possess a more or less pronounced fluorescence in the dissolved or finely divided state. They can be used for the optical brightening of the most diverse high molecular or low molecular organic materials or materials containing organic substances.

The following groups of organic materials may be mentioned as examples thereof, where optical brightening of these is relevant, and without the list given below being intended to express any limitation thereof:

I. Synthetic organic high molecular materials:

a. Polymerisation products based on organic compounds containing at least one polymerisable carbon-carbon double bond, that is to say their homopolymers or copolymers and their post-treatment products such as, for example, crosslinking products, grafting products or degradation products, polymer blends and the like, as examples of which may be mentioned:

Polymers based on α,β-unsaturated carboxylic acids, especially on acrylic compounds (such as, for example, acrylic esters, acrylic acids, acrylonitrile, acrylamides and their derivatives or their methacrylyl analogues), on olefine hydrocarbons (such as, for example, ethylene, propylene, isobutylene, styrenes and dienes, such as especially butadiene and isoprene, that is to say also rubbers and rubber-like polymers, as well as so-called ABS polymers), polymers based on vinyl and vinylidene compounds (such as, for example, vinyl esters, vinyl chloride, vinyl sulphonic acid, vinyl ethers, vinyl alcohol, vinylidene chloride and vinylcarbazole), on halogenated hydrocarbons (chloroprene or highly halogenated ethylenes), on unsaturated aldehydes and ketones (for example acrolein and the like), on allyl compounds and the like, graft polymerisation products (for example by grafting on vinyl monomers), crosslinking products (for example obtained using bifunctional or polyfunctional crosslinking agents such as divinylbenzene, polyfunctional allyl compounds or bisacrylyl compounds), or products obtainable by partial degradation (hydrolysis or depolymerisation) or modification of reactive groupings (for example esterification, etherification, halogenation or self-crosslinking).

b. Other polymerisation products, such as for example products obtainable by ring opening, for example polyamides of the polycaprolactam type, also formaldehyde polymers or polymers which are obtainable both through polyaddition and polycondensation, such as polyethers, polythioethers, polyacetals or thioplasts.

c. Polycondensation products or precondensates based on bifunctional or polyfunctional compounds prosessing groups capable of condensation, their homocondensation and co-condensation products, and also post-treatment products, as examples of which there may be mentioned:

Polyesters, which may be saturated (for example polyethylene terephthalate) or unsaturated (for example maleic acid-dialcohol polycondensates and their crosslinking products with copolymerisable vinyl monomers), unbranched or branched (and also based on higher-functional alcohols), such as for example alkyd resins); polyamides (for example hexamethylenediamine adipate), maleate resins, melamine resins, phenolic resins (novolacs), aniline resins, furane resins, carbamide resins and also their precondensates and products of analogous structure, polycarbonates, silicone resins and the like.

d. Polyaddition products such as polyurethanes (crosslinked and uncrosslinked) and epoxide resins.

II. Semi-synthetic organic materials such as, for example, cellulose esters or mixed esters, (acetate or propionate), nitrocellulose, cellulose ethers, regenerated cellulose (viscose or cuprammonium cellulose) or their post-treatment products, and casein plastics.

III. Natural organic materials of animal or vegetable origin for example based on cellulose or proteins such as wool, cotton, silk, bast, jute, hemp, furs and hair, leather, wood compositions in a finely divided form, natural resins (such as colophony, especially lacquer resins), and also rubber, guttapercha, balata and their post-treatment products and modification products (for example obtained by curing, crosslinking or grafting), degradation products, (for example obtained by hydrolysis or depolymerisation), or products obtainable by modification of reactive groups (for example by acylation, halogenation, crosslinking and the like).

The possible organic materials can be in the most diverse states of processing (raw materials, semi-finished goods or finished goods) and states of aggregation. They can, on the one hand, be in the form of structures of the most diverse kinds that is to say, for example, predominantly three-dimensional objects such as blocks, stabs, profiles, cubes, injection mouldings or the most diverse machined articles, chips or granules and foams; predominantly two-dimensional sheet-like structures such as films, foils, lacquers, strips, coverings, impregnations and coatings, or predominantly one-dimensional shaped structures such as filaments, fibres, flocks, bristles or wires. The said materials can, on the other hand, also be in un-shaped states, in the most diverse homogeneous and heterogeneous forms of distribution and states of aggregation, for example as powders, solutions, emulsions, dispersions and latices (examples: lacquer solutions, polymer dispersions, sols, gels, putties, pastes, waxes, adhesive compositions and filling compositions, and the like.

Fibre materials can for example be in the form of endless filaments, staple fibres, flocks, hanks, textile filaments, yarns, threads, fibre fleeces, felts, waddings, flocked structures or woven textile fabrics or textile laminates, knitted fabrics and papers, cardboards or paper compositions, and the like.

The compounds to be used according to the invention are also of significance for the treatment of textile organic materials, especially woven textile fabrics. Where fibres, which can be in the form of staple fibres or endless fibres, or in the form of hanks, woven fabrics, knitted fabrics, fleeces, flocked substrates or laminates, are to be optically brightened according to the invention, this is advantageously carried out in an aqueous medium, wherein the compound in question is present in a finely divided form (suspensions or, where appropriate, solutions). If desired, dispersing agents, such as for example soaps, polyglycol ethers of fatty alcohols, fatty amines or alkyl phenols, cellulose sulphite waste lye or condensation products of optionally alkylated naphthalenesulphonic acids with formaldehyde, can be added during the treatment. It is especially expedient to carry out the process in a neutral, weakly alkaline or acid bath. Equally, it is advantageous if the treatment is carried out at elevated temperatures of about 50° to 100°C, for example at the boiling point of the bath or near the boiling point (about 90°C). For the finishing according to the invention it is also possible to use solutions in organic solvents, such as is for example practised in the dyeing industry in so-called solvent dyeing (pad-thermofixing application, or exhaustion dyeing process in drum dyeing machinery), for example for polyamide and polyester substrates.

Further, the new optical brighteners to be used according to the invention can be added to, or incorporated into, the materials before or whilst they are shaped. Thus it is for example possible to add them to the compression moulding composition or injection moulding composition when mmanufacturing films, foils, strips or mouldings, or to dissolve or disperse them in the spinning composition, or otherwise ensure homogeneous fine distribution, before spinning. The optical brighteners can also be added to the starting substances, the reaction mixtures or intermediate products for the manufacture of fully synthetic or semi-synthetic organic materials, that is to say also before or during the chemical reaction, for example in the case of a polycondensation (that is to say also added to precondensates), in the case of a polymerisation (that is to say also added to prepolymers) or in the case of a polyaddition.

The new optical brighteners can, of course, also be employed in all cases where organic materials of the nature indicated above are combined with inorganic materials in any form (typical examples: detergents and white pigments in organic substances).

The new optically brightening substances are distinguished by particularly good heat resistance, fastness to light, and resistance to migration.

The amount of the new optical brighteners to be used according to the invention, relevant to the material to be optically brightened, can vary within wide limits. A distinct and durable effect is already achievable with very small amounts, in certain cases for example amounts of 0.001 per cent by weight. It is, however, also possible to employ amounts of up to about 0.5 per cent by weight and above. For most practical purposes, amounts of between 0.01 and 0.2 per cent by weight are of preferential interest.

The new compounds serving as brighteners can for example also be employed as follows:

a. Mixed with dyestuffs or pigments or as an additive to dyebaths, or printing, discharge or resist pastes. Also for the after-treatment of dyeings, prints or discharge prints.

b. Mixed with so-called "carriers," antioxidants, light protection agents, heat stabilisers or chemical bleaching agents, or as an additive to bleaching baths.

c. Mixed with crosslinking agents, finishing agents such as starch or synthetically accessible finishers. The products according to the invention can advantageously also be added to the liquors used to achieve a creaseproof finish.

d. In combination with detergents. The detergents and brighteners can be separately added to the wash baths to be used. It is also advantageous to use detergents which contain the brighteners as an admixture. Suitable detergents are for example soaps, salts of sulphonate detergents, such as for example of sulphonated benzimidazoles substituted by higher alkyl radicals at the 2-carbon atom, also salts of monocarboxylic acid esters of 4-sulphophthalic acid with higher fatty alcohols, as well as salts of fatty alcohol sulphonates or alkylarylsulphonic acids or condensation products of higher fatty acids with aliphatic hydroxysulphonic or aminosulphonic acids. Further, it is possible to employ non-ionic detergents, for example polyglycol ethers which are derived from ethylene oxide and higher fatty alcohols, alkylphenols or fatty amines.

e. In combination with polymeric carrier materials (polymerisation, polycondensation or polyaddition products), which contain the brighteners, optionally alongside other substances, in a dissolved or dispersed form, for example in the case of coating or impregnating agents or adhesives (solutions, dispersions or emulsions) for textiles, fleeces paper, or leather.

f. As additives to the most diverse industrial products in order to make these more marketable or to avoid disadvantages in their utilization, for example as an additive to glues, adhesives, toothpastes, paint materials and the like.

g. In combination with other substances which act as optical brighteners (for example in order to change the shade).

h. In spinning bath preparations, that is to say as additives to spinning baths such as are used to improve slip for the further processing of synthetic fibres.

The compounds of the initially mentioned formula can be used as scintillators for various purposes of a photographic nature, such as for electrophotographic reproduction or for supersensitisation.

If the brightening process is combined with other treatment methods or finishing methods, the combined treatment is advantageously carried out with the aid of appropriate stable preparations. Such preparations are characterised in that they contain the optically brightening compounds of the initially mentioned general formula and dispersing agents, detergents, carriers, dyestuff, pigments or finishing agents.

In the treatment of a series of fibre substrates, for example of polyester fibres, with the brighteners according to the invention, the procedure followed is appropriately to impregnate these fibres with the aqueous dispersions of the brighteners at temperatures below 75°C, for example at room temperature, and to subject them to a dry heat treatment at temperatures above 100°C, in which case it is generally advisable first still to dry the fibre material at a moderately elevated temperature, for example at not less than 60°C up to about 100°C. The heat treatment in the dry state is then advantageously carried out at temperatures between 120° and 225°C, for example by warming in a drying chamber, by ironing within the indicated temperature range, or by treatment with dry, superheated steam. The drying and dry heat treatment can also be carried out in immediate succession or be combined into a single process step.

EXAMPLE 1

6.0 g of 3,7-dicyanodibenzofurane and 13.0 g of 3-hydroxy-4-aminobiphenyl in 60 g of polyphosphoric acid are stirred under a stream of nitrogen at 80°C, the temperature is raised to 210°C over the course of 1 hour, and the solution is kept at this temperature for a further hour. After cooling to 100°C, 200 ml of water are added all at once. The product which has precipitated is filtered off at room temperature, washed with water and dilute aqueous sodium bicarbonate solution until neutral and dried in vacuo at 100°C. After extraction with dimethylformamide, crystallisation from trichlorobenzene, high vacuum sublimation at 340° to 380°C and a further crystallisation from trichlorobenzene using fuller's earth, 7.7 g (50 percent of theory) of the compound of the formula (17) are obtained in the form of pale yellow flakes of melting point 346° to 347°C.

(17)

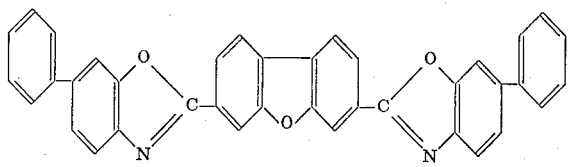

The same product is obtained in accordance with the above process, if instead of 3,7-dicyanodilbenzofurane corresponding amounts of dibenzofurane-3,7-dicarboxylic acid are used.

Analysis: (after repeated recrystallisation from trichlorobenzene and sublimation), melting point 346° to 347°C.
$C_{38}H_{22}N_2O_3$ (554.57)

| | C | | H | | N | | O | |
|---|---|---|---|---|---|---|---|---|
| Calculated: | C | 82.29 | H | 4.00 | N | 5.06 | O | 8.66 |
| Found: | C | 82.03 | H | 3.98 | N | 5.18 | O | 8.70 |

The 3,7-dicyano-dibenzofurane of the formula (43)

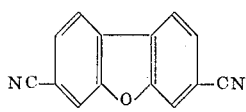

used as the starting material in accordance with the first process variant can be manufactured as follows:

49.7 g (0.25 mol) of 3,7-diaminodibenzofurane in 350 ml of water and 125 ml of concentrated hydrochloric acid are stirred in an ice bath and tetrazotised by dropwise addition of a solution of 35.0 g (0.5 mol) of sodium nitrite in 50 ml of water at 2° to 6°C over the course of half an hour. The resulting diazonium solution is added dropwise at 10° to 15°C, over the course of 1½ hours, to an aqueous copper cyanide solution (obtained by dropwise addition of a solution of 140 g of potassium cyanide (96 percent pure) in 250 ml of water to a solution of 125 g of crystalline copper sulphate in 500 ml of water). The foaming mixture is stirred for 4 hours, then neutralised with concentrated sodium hydroxide solution to a $p_H$ value of 6, briefly boiled, cooled and filtered. The brownish residue is repeatedly washed with water, dried and sublimed in a high vacuum at 250°C. The sublimate (35.0 g) is crystallised from o-dichlorobenzene. 30.8 g (= 57 percent of theory) of yellowish needles of melting point 324° to 327°C are obtained; after recrystallisation from dimethylsuphoxide the melting point is 333°C.

The dibenzofurane-3,7-dicarboxylic acid of the formula (44)

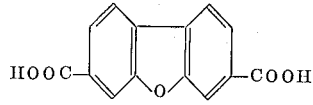

used at the starting product in accordance with the second process variant can be manufactured as follows: 200 g of chromium trioxide are introduced in small portions, over the course of about 3 hours, into a solution of 49.0 g of 3,7-dimethyl-dibenzofurane (Helv. 52, (1969), 1321) in 750 ml of glacial acetic acid, at 50°C. After comletion of the reaction, the mixture is diluted with water and filtered, and the residue is washed with water and dried. To remove 3-methyl-dibenzofurane-7-carboxylic acid (melting point 291° to 292°C, from glacial acetic acid), the product is extracted with boiling glacial acetic acid and the insoluble dibenzofurane-3,7-dicarboxylic acid is dried.

Another very suitable method of manufacture of the compound of the formula (44) consists of stirring a suspension of 10.9 g (0.05 mol) of 3,7-dicyano-dibenzofurane of the formula (43) in 100 ml of 70 percent strength sulphuric acid for 3 hours under reflux (about 170°C). After cooling, the mixture is filtered and the residue is washed with water until neutral and dired in vacuo at 100°C. 10.8 g of dicarboxylic acid of melting point > 400°C are obtained.

A third variant for the manufacture of the dicarboxylic acid according to the formula (44) consists of diazotising 4-amino-3-nitrobenzoic acid and converting the product by means of copper into the compound of the formula (45)

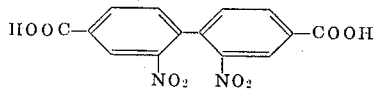

(melting point 345°C, with decomposition, from alcohol). Hydrogenation of the dinitro compund of the formula (45) with the aid of palladium on charcoal yields the diamino compounds of the formula

(46) 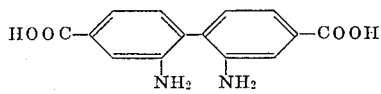

of melting point 298°C (decomposition) (from alcohol-water), which can be converted by diazotisation and subsequent heating into the dibenzofurane-3,7-dicarboxylic acid of melting point > 400°C (from dimethylsulphoxide-water).

Heating the dicarboxylic acid of the formula (44) in thionyl chloride in the presence of 1 percent of dimethylformamide for 1½ hours at the reflux temperature yields the acid chloride of the formula

(47) 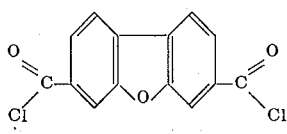

which crystallises from toluene in the form of yellow needles (melting point 202°C).

EXAMPLE 2

8.0 g (0.03 mol) of 3,7-dicyano-dibenzothiophenedioxide and 7.2 g (0.066 mol) of o-aminophenol in 50 g of polyphosphoric acid are stirred for 20 hours at 220°C under nitrogen. After briefly raising the temperature to 250°C, the mixture is cooled to 100°C and 100 ml of water are added all at once. The product which has precipitated is filtered off at room temperature, washed with water until neutral and dried at 120°C. 13.7 g of a beige product of melting point 395° to 400°C are obtained. Recrystallisation from dimethylsulphoxide and high vacuum sublimation at 330°C yields 7.6 g of a pale yellow powder of melting point 401° to 402°C, of the formula

(48) 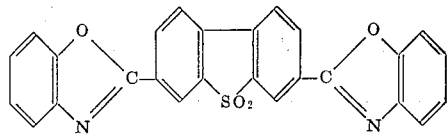

Analysis: after crystallisation from dimethylsulphoxide,long, light yellow, felted small needles of melting point 400° to 401° C.
$C_{26}H_{14}N_2O_4S$ (450.47)

| Calculated: | C | 69.32 | H | 3.13 | S | 7.12 |
| Found: | C | 69.21 | H | 3.10 | S | 7.41 |

The 3,7-dicyano-dibenzothiophene-dioxide of the formula

(49) 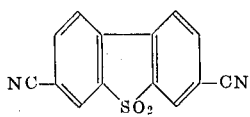

used as the starting product can be manufactured analogously to the 3,7-dicyanodibenzofurane by using the corresponding amount of benzidinesulphone instead of 3,7-diaminodibenzofurane. Starting from 123 g (0.5 mol) of benzidenesulphone, 46.3 g (35 percent of theory) (after crystallisation from dimethylsulphoxide, 40.6 g) of light yellow needles of melting point > 400°C are obtained after the high vacuum sublimatin.

EXAMPLE 3

An analogous procedure to that described in Example 1 is followed, but 3,7-dicyanodibenzofurane is condensed with 4,5-dimethyl-2-aminophenol (10 percent excess) instead of with 3-hydroxy-4-aminobiphenyl. In this case, after high vacuum sublimation at 380°C and crystallisation from trichlorobenzene, 8.6 g (75 percent of theory) of the compound of the formula

(50) 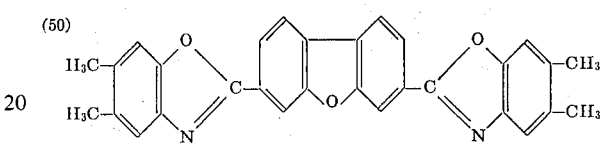

of melting point 390° to 400°C are obtained.

Analysis: after recrystallisation from trichlorobenzene using fuller's earth as an auxiliary, pale yellow felted small needles are obtained.
$C_{30}H_{22}N_2O_3$ (458.49)

| Calculated: | C | 78.58 | H | 4.84 | N | 6.11 |
| Found: | C | 78.55 | H | 4.92 | N | 6.05 |

EXAMPLE 4

A mixture of 5.2 g of dibenzofurane-3,7-dicarboxylic acid, 7.0 g of 1-aminonaphthol-2, 0.15 g of boric acid, 0.05 g of piperidine and 40 ml of trichlorobenzene is stirred in a stream of nitrogen for 1½ hours at 160°C and then for 20 hours at the reflux temperature, during the course of which a little water of reaction and solvent distil off. After cooling, the mixture is filtered, and the beige residue is washed with isopropanol, dried and fractionally sublimed in a high vacuum. A brown first run which sublimes at 250°C is discarded; between 250° and 400°C, 4.7 g of a sparingly soluble product of the formula

(51) 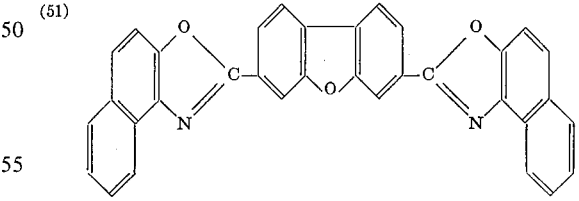

sublime as a greenish-tinged powder of melting point 385° to 400°C. This material is extracted by boiling with dimethylsulphoxide and trichlorobenzene, and is resublimed: pale greenish-yellow product of melting point 393° to 394°C.

| Analysis: | $C_{34}H_{18}N_2O_3$ | (502.50) | | |
| Calculated: | C | 81.26 | H | 3.61 | N | 5.58 |
| Found: | C | 80.81 | H | 3.51 | N | 5.54 |

EXAMPLE 4

Analogously to the procedure described in Example 1, 12.2 of 3-hydroxy-4-aminobiphenyl are condensed with 6.45 g of dicyanodibenzothiophene instead of 3,7-dicyanodibenzofurane. 17.5 of a product are obtained, which after purification by high vacuum sublimation and crystallisation from dimethylsulphoxide, trichlorobenzene and methylpyrrolidone shows a melting point of 320° to 321°C (light yellow crystals) and corresponds to the formula (52)

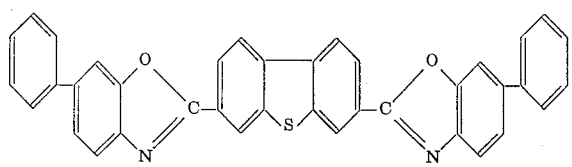

| Analysis: | $C_{38}H_{22}N_2O_2S$ | (570.67) | | | |
|---|---|---|---|---|---|
| Calculated: | C 79.98 | H | 3.89 | N | 4.91 |
| Found: | C 79.91 | H | 3.88 | N | 5.14 |

The 3,7-dicyanodibenzothiophene used as the starting material is manufactured from 3,7-diaminodibenzo- (54)

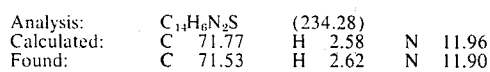

thiophene in an analogous manner to that described for the manufacture of 3,7-dicyanodibenzofurane (compare Example 1): pale yellow crystals of melting point 356° to 358°C (after recrystallisation from trichlorobenzene and high vacuum sublimation).

| Analysis: | $C_{14}H_6N_2S$ | (234.28) | | | |
|---|---|---|---|---|---|
| Calculated: | C 71.77 | H | 2.58 | N | 11.96 |
| Found: | C 71.53 | H | 2.62 | N | 11.90 |

EXAMPLE 6

8.2 g of dibenzothiophene-3,7-dicarboxylic acid, 50 ml of chlorobenzene, 20 ml of thionyl chloride and 0.5 ml of dimethylformamide are heated under reflux and the excess thionyl chloride is gradually distilled off. After the evolution of hydrogen chloride has ceased, the solution is cooled, and the acid chloride which has precipitated is filtered off and dried.

A mixture of 6.7 g of this acid chloride, 7.5 g of 1-amino-2-naphthol and 80 ml of anhydrous trichlorobenzene is stirred for 1 hour at 150°C. 0.15 g of boric acid and 0.05 g of piperidine are further added to the thick suspension of the acid amide produced, and the mixture is heated for 3 hours to the reflux temperature, in the course of which the water of reaction distills off together with some trichlorobenzene. After cooling to room temperature, the mixture is filtered, and the residue is dried and sublimed in a high vacuum at 360°C. 2.7 g of a product are obtained, which after recrystllisation from dimethylsulphoxide and trichlorobenzene, and subsequent high vacuum sublimation, arises in the form of green-yellow crystals of melting point 378°C and corresponds to the formula (53)

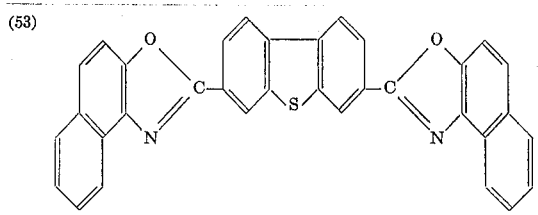

The dibenzothiophene-3,7-dicarboxylic acid (melting pont > 400°C) used as the starting material can be manufactured by saponification of 3,7-dicyano-dibenzothiophene, analogously to the saponification of 3,7-dicyano-dibenzofurane (Example 1).

EXAMPLE 7

5.6 g of the compound of the formula (17) in 50 ml of concentrated sulphuric acid are stirred for 15 hours at room temperature. The solution is carefully poured into 500 ml of ice water and neutralised with 30 percent strength sodium hydroxide solution (about 175 ml). After brief boiling up, and cooling, the product which was precipitated is filtered off, repeatedly washed with water and dried. 6.4 g of a pale yellow product of the formula

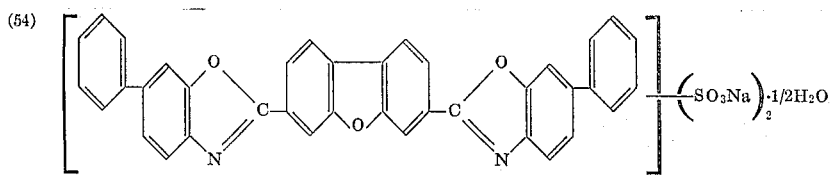

are obtained.

| Analysis | $C_{38}H_{21}N_2Na_2O_{9.5}S_2$ | (767.70) | | | | | |
|---|---|---|---|---|---|---|---|
| Calculated: | C 59.54 | H | 2.76 | N | 3.65 | S | 8.35 |
| Found: | C 59.22 | H | 2.87 | N | 3.75 | S | 8.71 |

EXAMPLE 8

5.9 g (0.02 mol) of dibenzofurane-3,7-dicarboxylic acid chloride (compare formula (47)) and 7.4 g (0.04 mol) of 3-hydroxy-4-aminobiphenyl in 50 ml of chlorinated biphenyl (containing 21 percent of chlorine) are stirred in at 150° to 170°C. In the course thereof, the yellow acid amide of the formula (55)

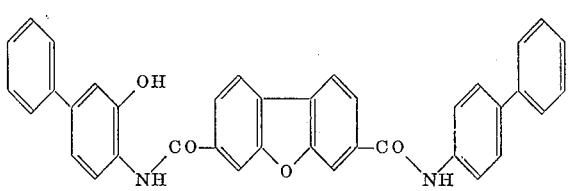

separate out in a voluminous form, in approximately quantitative yield. After the evolution of hydrogen chloride has ceased, the mixture is heated for 2 to 3 hours (283° to 286°C) whilst passing in nitrogen, and about 3 ml of the solvent, together with the water formed, are distilled off. In the course thereof, the acid amide dissolves completely, and thereafter, having cooled the mixture to room temperature, the dibenzoxazolyl compound crystallises in the form of flakes. After filtering off, washing with dimethylsulphoxide and alcohol, 10.5 g (95 percent of theory) of the compound of the formula (17), of melting point 342° to 347°C (cloudy) are obtained.

The compounds given below can be manufactured analogously to procedures explained above

(12) 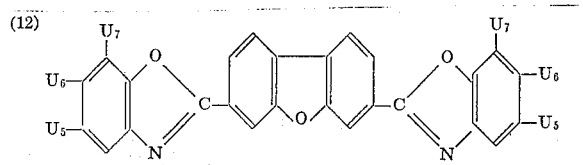

| Formula No. | U₅= | U₆= | U₇ |
|---|---|---|---|
| 56 | H— | CH₃— | H— |
| 57 | CH₃— | H— | CH₃— |
| 58 | Cl— | H— | (CH₃)₃—C— |
| 59 | (CH₃)₃C—CH₂—(CH₃)₂C— | H— | H— |
| 60 | C₆H₅—(CH₃)₂C— | H— | H— |
| 61 | ⌬ | H— | H— |
| 62 | (CH₃)₃C— | H— | H— |
| 63 | CN—CH₂—CH₂— | H— | H— |
| 64 | H— | CH₃OOC— | H— |
| 65 | CH₃—(CH₂)₁₁— | H— | H— |
| 66 | (CH₃)₃C—CH₂— | H— | (CH₃)₃C—CH₂ |
| 67 | H— | C₆H₅O— | H— |
| 68 | H— | Cl— | H— |
| 69 | C₂H₅OOC— | H— | H— |
| 70 | CH₃—SO₂— | H— | H— |

EXAMPLE 9

The procedure followed is analogous to that described in Example 8, but with the addition of 0.5 g of boric acid for the second reaction stage and with the use of 0.04 mol of 2-amino-4-methoxyphenol or 3-amino-4-hydroxybiphenyl instead of 3-hydroxy-4-aminobiphenyl. The corresponding compounds of the formula (71) and (72) are obtained;

(71) 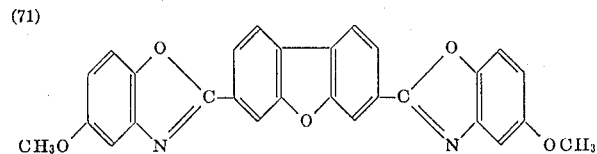

Melting point: 320° to 322°C after high vacuum sublimation and crystallisation from N-methylpyrrolidone and trichlorobenzene.

| Analysis: | C₂₈H₁₈N₂O₃ | | (462.44) | |
|---|---|---|---|---|
| Calculated: | C 72.72 | H 3.92 | N 6.06 | |
| Found: | C 72.55 | H 4.10 | N 6.11 | |

(72) 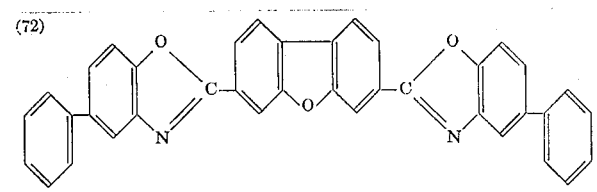

Melting point: about 400°C (cloudy) after fractional high vacuum sublimation and crystallisation from trichlorobenzene.

| Analysis: | C₃₈H₂₂N₂O₃ | | (554.57) | |
|---|---|---|---|---|
| Calculated: | C 82.29 | H 4.00 | N 5.06 | |
| Found: | C 82.15 | H 3.97 | N 5.05 | |

EXAMPLE 10

2.95 g (0.01 mol) of dibenzofurane-3,7-dicarboxylic acid chloride of the formula (22) and 5.0 g (0.02 mol) of 3-bromo-4-aminobiphenyl in 50 ml of dichlorobenzene are heated to 180°C for 1 hour. After cooling to room temperature, the mixture is filtered and the residue is washed with toluene and dried. 6.9 g (96 percent of theory) of the compound of the formula

(73) 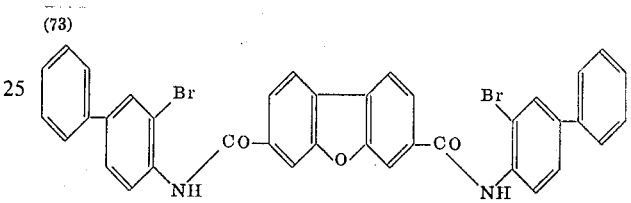

are obtained in the form of colourless crystals of melting point 316 to 317°C (recrystallised from dimethylformamide).

| Analysis: | C₃₈H₂₄Br₂N₂O₃ | | (716.43) |
|---|---|---|---|
| Calculated: | C 63.71 | H 3.38 | N 3.91 |
| Found: | C 63.91 | H 3.36 | N 3.91 |

A mixture of 2.9 g of the compound of the formula (73), 1.0 g of copper acetate, 0.2 g of copper powder, 50 ml of dimethylformamide and 5 ml of pyridine is heated to the boil under a nitrogen atmosphere for 5 hours. After cooling to room temperature, the product which has separated out is filtered off, washed with two 5 ml portions of dimethylformamide and dried. 2.1 g (95 percent of theory) of the compound of the formula (17) are obtained; after recrystallisation from trichlorobenzene, the compound begins to melt at 340°C.

EXAMPLE 11

1.37 g of the dicarboxylic acid of the formula

(74) 

13 ml of thionyl chloride and 0.1 ml of dimethylformamide are heated to the reflux temperature for one hour, and the excess thionyl chloride is filtered off in vacuo. 1.85 g of 3-hydroxy-4-aminobiphenyl and 30 ml of chlorinated biphenyl (chlorine content 21 percent are added to the acid chloride formed, and the mixture is heated to 180°C. When the evolution of hydrogen chloride has ceased, 0.2 g of boric acid are added to the thick suspension of the acid amide formed, of the formula

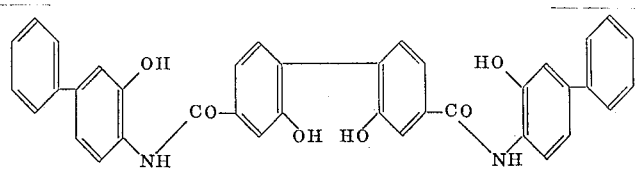

and the temperature is raised to 280° to 290°C whilst passing in nitrogen. 15 ml of solvent, together with the water of reaction formed, are distilled off over the course of 2 to 3 hours. After cooling to room temperature, the precipitate is filtered off, washed with dimethylformamide and dried. 0.7 g of a product melting above 400°C is obtained, and this is sublimed in a high vacuum at 380°C over the course of about 40 hours. The sublimate consists of 0.3 g of the compound of the formula (17), of melting point 340° to 343°C (cloudy).

If instead of the dicarboxylic acid of the formula (74), its ester of the formula

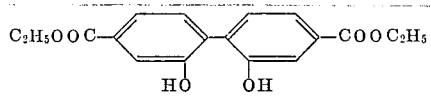

is condensed with 3-hydroxy-4-amino-biphenyl in polyphosphoric acid according to Example 1, the compound of the formula (17) is again obtained after high vacuum sublimation at 380°C.

The dicarboxylic acid ester of the formula (76) [melting point 209 to 210°C from alcohol] used as the starting product is obtained by reaction of the dicarboxylic acid formula (74) with thionyl chloride and boiling the resulting acid chloride with alcohol. The dicarboxylic acid of the formula (74) is manufactured by hydrolysis of 2,2'-dichloro-4,4'-dicyano-biphenyl (melting point 169°C from perchloroethylene) with 50 percent strength sodium hydroxide solution at 290°C in an autoclave. FInally, 2,2'-dichloro-4,4'-di-cyano-biphenyl is obtained by reaction of diazotised 2,2'-dichlorobenzidine with copper cyanide according to Sandmeyer.

EXAMPLE 12

If in Example 8, the dibenzofurane-3,7-dicarboxylic acid chloride is replaced by 0.04 mol of the corresponding methyl ester or ethyl ester of the formula

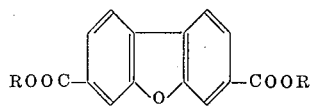

(77a) R = —CH₃ melting point 246°C (from chlorobenzene)
(77b) R = —C₂H₅ melting point 154°C (from alcohol), and 0.5 g of boric acid and 1 g of pyridine are further added, the compound of the formula (17) is again obtained.

EXAMPLE 13

If in Example 8 the dibenzofurane-3,7-dicarboxylic acid chloride is replaced by the equivalent quantity of the 2,8-dimethoxy derivative of the formula

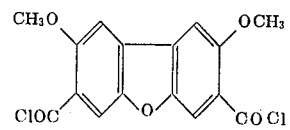

and 7 percent of boric acid (relative to dimethoxy compound of the formula (78)) are further added, the compound of the formula

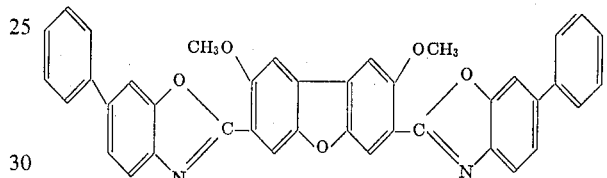

is obtained as yellowish glistening flakes of melting point >400°C (from trichlorobenzene, high vacuum sublimation).

| Analysis: | C₄₀H₂₆N₂O₅ | (614.62) | |
|---|---|---|---|
| Calculated: | C 78.16 | H 4.26 | N 4.56 |
| Found: | C 78.07 | H 4.08 | N 4.43 |

The 2,8-dimethoxy-3,7-dicarboxylic acid chloride of the formula (78), of melting point 230° to 233°C, which is used as the starting product, is obtained by chlorination of 2,8-dimethoxy-dibenzofurane-3,7-dicarboxylic acid with phosphorus pentachloride in boiling xylene.

The compounds

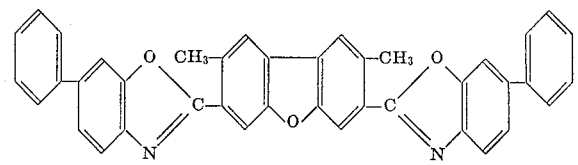

and

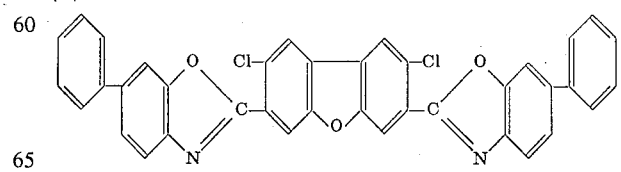

can be manufactured entirely analogously.

EXAMPLE 14

The analogous procedure to that described in Example 8 is followed, but using 11.7 g (0.04 mol) of dibenzofurane-3,7-dicarboxylic acid chloride, 7.4 g (0.04 mol) of 3-hydroxy-4-amino-biphenyl and 5.6 g of 2-amino-4-methoxy-phenol in 100 ml of chlorinated biphenyl (chlorine content 21 percent) and 0.5 g of boric acid for the second stage.

After recrystallisation from trichlorobenzene, using fuller's earth as an auxiliary, 19.6 g of a mixture of the compounds of the formulae (17), (71) and (82)

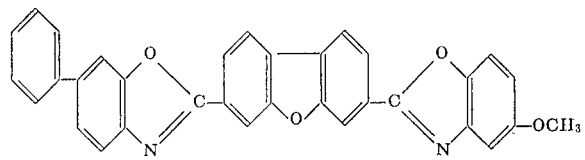

of melting point 270° to 288°C is obtained.

EXAMPLE 15

3,7-dicyano-dibenzothiophene-dioxide of the formula (49) is condensed, in an analogous manner to that described in Example 2, with substituted aminophenols in polyphosphoric acid, for 2 hours at 220° to 230°C. This yields the benzoxazoles of the formulae (84) to (88), corresponding to the general formula (83)

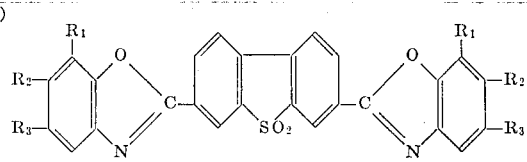

| Formula | R₁ | R₂ | R₃ | melting point °C (recrystallised from) | Empirical formula calculated | Analysis Molecular weight found | | |
|---|---|---|---|---|---|---|---|---|
| (84) | H | H | CH₃ | >400 (Trichlorobenzene) | C₂₈H₁₈N₂O₄S C 70.28 C 70.16 | (478.52) H 3.79 H 3.76 | N 5.85 N 5.73 | |
| (85) | H | CH₃ | H | >400 (Trichlorobenzene) | C₂₈H₁₈N₂O₄S C 70.28 C 70.31 | (478.52) H 3.79 H 3.73 | N 5.85 N 5.91 | |
| (86) | H | CH₃ | CH₃ | >400 (Trichlorobenzene) | C₃₀H₂₂N₂O₄S C 71.13 C 71.20 | (506.58) H 4.38 H 4.26 | N 5.53 N 5.28 | |
| (87) | CH₃ | H | CH₃ | >400 (Trichlorobenzene) | C₃₀H₂₂N₂O₄S C 71.13 C 71.03 | (506.58) H 4.38 H 4.38 | N 5.53 N 5.75 | |
| (88) | H | H | Cl | >400 (Aroclor 1221) | C₂₆H₁₂Cl₂N₂O₄S N 5.39 N 5.46 | (519.36) | | |

EXAMPLE 16

2.5 g of the compound of the formula (48) in 25 ml of 25 percent strength oleum are stirred at room temperature for 2⅔ hours. The solution is poured out onto approx. 250 g of ice and the disulphonic acid which precipitates in a voluminous form is filtered off. It is suspended in water and neutralized at the boil with 30 percent strength sodium hydroxide solution. After cooling, the resulting disodium salt is filtered off and recrystallised from water-alcohol, (25 ml/6 ml), using active charcoal as an auxiliary. After drying, 2.9 g of a yellowish product of the formula (89)

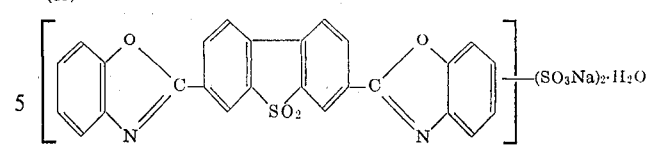

are obtained, which dissolves in water with a bluish fluorescence.

Analysis: C₂₆H₁₄N₂Na₂O₁₁S₃ (672.56)
Calculated: C 46.43 H 2.10 N 4.17 S 14.30
Found: C 46.47 H 2.21 N 3.95 S 14.11

EXAMPLE 17

6.8 g (0.02 mol) of dibenzothiophene-dioxide-3,7-dicarboxylic acid dichloride and 6.1 g (0.02 mol) of 2-amino-4-isopropyl-phenol in 50 ml of chlorinated biphenyl (containing 21 percent of chlorine) are stirred at 150° to 170°C. Hereupon, the yellow acid amide of the formula (90)

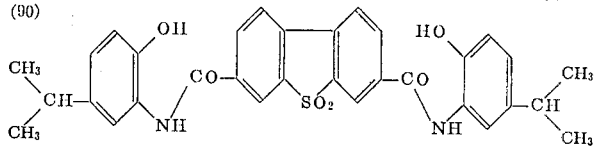

separates out in a voluminous form. After the evolution of hydrogen chloride has ceased, the mixture is heated to the boil (275° to 285°C) for approx. 1 hour whilst passing in nitrogen, and a few ml of solvent are distilled off together with the water formed. In the course thereof, the acid amide dissolves completely and after cooling to room temperature the dibenzoxazolyl compound crystallises out. After filtering off and twice washing with 30 ml of dimethylformamide and 30 ml of alcohol, 8.8 g (82 percent of theory) of the compound of the formula (91)

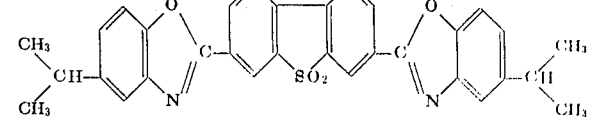

are obtained in the form of yellow, felted small needles. Melting point 303°C (after twice recrystallising from chlorobenzene).

| Analysis: | $C_{32}H_{26}N_2O_4S$ | (534.63) | | | | |
|---|---|---|---|---|---|---|
| Calculated: | C 71.89 | H 4.90 | N 5.24 | | | |
| Found: | C 71.79 | H 4.86 | N 5.14 | | | |

The dibenzothiophene-dioxide-3,7-dicarboxylic acid chloride used as the starting material can be manufactured as follows: 50.3 g of 3,7-dicyano-dibenzothiophene-dioxide in 400 ml of 78 percent strength sulphuric acid are heated for 3 hours to 170°whilst stirring. In the course thereof, the nitrile dissolves and the dicarboxylic acid of the formula

(92) 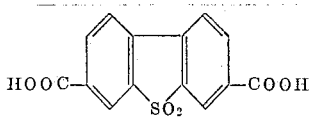

separates out. After cooling, the acid is filtered off, washed with water until neutral and dried in vacuo at 100°C. 55.6 g (96 percent of theory) of a colourless powder of melting point >400°C, which can be recrystallised from dimethylformamide, are obtained.

55.5 g of the crude dibenzothiophene-3,7-dicarboxylic acid thus obtained, in 180 ml of phosphorus oxychloride and 112 g of phosphorus pentachloride, are slowly heated to the reflux temperature, whilst stirring. When the splitting off of hydrochloric acid has ceased, the mixture is kept at the reflux temperature for a further hour and is then evaporated to dryness in vacuo at 100°C. 62.3 g of the dicarboxylic acid chloride of the formula

(93) 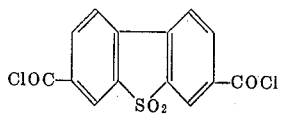

are obtained as an almost colourless powder of melting point 209° to 210°C.

After recrystallisation from xylene: melting point 213°C.

| Analysis: | $C_{14}H_6Cl_2O_3S$ | (341.17) | | | | |
|---|---|---|---|---|---|---|
| Calculated: | C 49.29 | H 1.77 | S 9.40 | | | |
| Found: | C 49.42 | H 1.86 | S 9.53 | | | |

EXAMPLE 18

The following dibenzoxazoles of the formulae (95) to (99), corresponding to the general formula

(94) 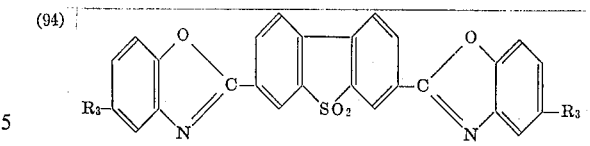

are obtained analogously to the description in Example 17.

| Formual No. | $R_3$ | Melting point, °C. (recrystallised from) | Empirical formula (molecular weight) | Calculated | | | Found | | |
|---|---|---|---|---|---|---|---|---|---|
| | | | | C | H | N | C | H | N |
| (95) | CH₃−C(CH₃)₂−CH₂−C(CH₃)₂− | 324 (dichlorobenzene) | $C_{42}H_{46}N_2O_4S$ (674.90) | 74.75 | 6.87 | 4.15 | 74.46 | 6.76 | 4.09 |
| (96) | C₆H₅−C(CH₃)₂− | 283 (chlorobenzene) | $C_{44}H_{34}N_2O_4S$ (686.83) | 76.95 | 4.99 | 4.08 | 76.74 | 5.03 | 4.20 |
| (97) | cyclohexyl | 332 (dichlorobenzene) | $C_{38}H_{34}N_2O_4S$ (614.76) | 74.24 | 5.57 | 4.56 | 74.32 | 5.48 | 4.34 |
| (98) | CH₃−C(CH₃)₂− | 355 (chlorobenzene) | $C_{34}H_{30}N_2O_4S$ (562.69) | 72.58 | 5.37 | 4.98 | 72.59 | 5.37 | 5.11 |
| (99) | CN−CH₂−CH₂− | 262 (sublimed, dimethylformamide) | $C_{32}H_{20}N_4O_4S$ (556.60) | | 10.07 | | | | 9.78 |

The bisbenzoxazoles of the formula (83) in which the meaning of $R_2$ = hydrogen, and the compounds of the formula (121) to (124) listed in the table below, can also be manufactured according to the instructions of the procedures which have been described.

| Formula No. | $R_1$ | $R_3$ |
|---|---|---|
| (100) | −CH(CH₃)−CH₂−CH₃ | −H |
| (101) | −H | −C₆H₅ |
| (102) | −H | −OCH₃ |
| (103) | −H | −OC₆H₅ |
| (104) | −H | −COO−(CH₂)₃−CH₃ |
| (105) | −C(CH₃)₃ | −CH₃ |

-Continued

| Formula No. | R₁ | R₃ |
|---|---|---|
| (106) | —H | —C₂H₅ |
| (107) | —H | —CH(CH₃)—CH₂—CH₃ |
| (108) | —H | —CH₂—CH₂—CH₃ |
| (109) | —H | —CH₂—C₆H₅ |
| (110) | —H | —SO₂—CH₃ |
| (111) | —CH₃ | —H |
| (112) | —H | —COO—CH₂—CH₂—O—CH₃ |
| (113) | —CH₃ | —Cl |
| (114) | —C(CH₃)₃ | —H |
| (115) | —H | —C(CH₃)—CH₂—C(CH₃)₃ |
| (116) | —H | —(CH₂)₁₁—CH₃ |
| (117) | —CH₃ | —C—(CH₃)₃ |
| (118) | —Cl | C(CH₃)₂—CH₂—C(CH₃)₃ |
| (119) | —C(CH₃)₃ | —Cl |
| (120) | —CH₂—C(CH₃)₃ | —CH₂—C(CH₃)₃ |

(121) [structure: benzoxazole—SO₂—benzoxazole with fused H rings]

(122) [structure: benzoxazole—SO₂—benzoxazole with fused cyclopentane rings]

(123) [structure: phenyl-substituted benzoxazole—SO₂—benzoxazole-phenyl]

(124) [structure: NaO₃S and SO₃Na substituted benzoxazole—SO₂—benzoxazole]

EXAMPLE 19

100 parts of terephthalic acid-ethylene glycol polyester granules are intimately mixed with 0.05 part of one of the compounds of the formulae (17), (50), (51), (52), (53), (71), (84), (85), (87), (88), (91), (95), (96), (97), (98), (105) or (117), and melted at 285°C whilst stirring. After spinning the spinning composition through customary spinnerets, greatly brightened polyester fibres having excellent fastness to light are obtained.

EXAMPLE 20

10,000 parts of a polyamide in chip form, manufactured in a known manner from hexamethylenediamine adipate, are mixed for 12 hours in a tumbler vessel with 30 2 parts of of titanium dioxide (rutile modification) and 2 parts of one of the compounds of the formulae (17), (51), (54), (71) or (72). The chips thus treated are melted whilst excluding atmospheric oxygen, and this melt is spun. The filaments obtained show a good brightening effect.

EXAMPLE 21

A woven polyester fabric is padded cold with an aqueous dispersion which per litre of liquor contains 0.1 to 3 g of one of the compounds of the formula (17) or (91), and 1 g of an addition product of about 8 mols of ethylene oxide and 1 mol of octylphenol. The fabric is dried at 70° to 80°C, and developed at 200° to 230°C for a few seconds to 2 minutes, depending on the temperature. The material thus treated shows a considerably higher degree of whiteness than the untreated material.

EXAMPLE 22

A woven fabric of polyamide 6 fibres is introduced, using a liquor ratio of 1:40, into a bath at 60°C which (relative to the weight of fabric) contains 0.2 percent of one of the brighteners of the formulae (54) or (89) and also 1 g of 80 percent strength acetic acid and 0.25 g of an addition product of 30 to 35 mols of ethylene oxide to 1 mol of stearyl alcohol (technical product) per litre. The system is heated to the boil over the course of 30 minutes and is kept boiling for 30 minutes. After rinsing and drying, a strong brightening effect is obtained.

I claim:

1. A symmetrical bisaroxazolyl compound of the formula

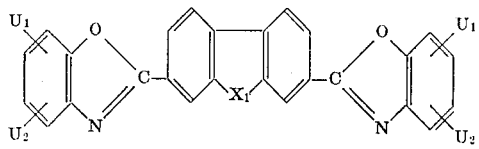

wherein $X_1$ represents a bridge member —O— or —$SO_2$—, $U_1$ denotes hydrogen, alkyl with 1 to 12 carbon atoms, chlorine, cyclohexyl, phenylalkyl with 1 to 4 carbon atoms in the alkyl part, cyanoethyl, phenyl, alkoxy with 1 to 4 carbon atoms, and $U_2$ denotes hydrogen, an alkyl group with 1 to 5 carbon atoms or chlorine, and wherein furthermore $U_1$ together with $U_2$ can form a fused benzene ring.

2. A symmetrical bis-benzoxazolyl compound according to claim 1 which correspond to the formula

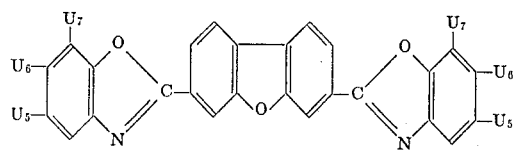

wherein at least one of the symbols $U_7$, $U_6$ and $U_5$ denotes hydrogen and, for the rest, $U_7$ denotes hydrogen, chlorine or alkyl with 1 to 5 carbon atoms, $U_6$ denotes hydrogen, or alkyl with 1 to 4 carbon atoms and $U_5$ denotes hydrogen, alkyl with 1 to 12 carbon atoms, cyclohexyl, chlorine, cyanoethyl, alkoxy with 1 to 4 carbon atoms, phenyl, phenylalkyl with 1 to 4 carbon atoms in the alkyl part.

3. A symmetrical bis-benzoxazolyl compound according to claim 1 which correspond to the formula

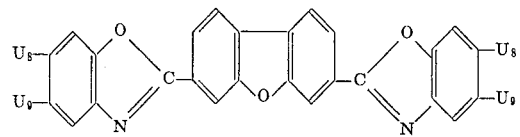

wherein $U_8$ denotes hydrogen, alkyl with 1 to 4 carbon atoms or phenyl and $U_9$ denotes hydrogen or alkyl with 1 to 4 carbon atoms, and, if $U_8$ represents hydrogen, can also dentoe phenyl or methoxy.

4. The compound according to claim 1 which corresponds to the formula

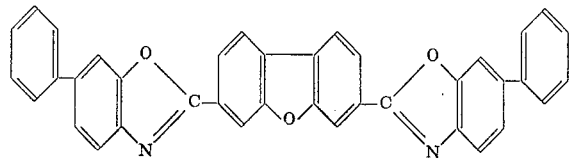

5. A symmetrical bis-benzoxazolyl compound according to claim 1 which correspond to the formula

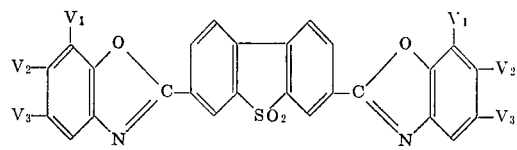

wherein at least one of the symbols $V_1$, $V_2$ and $V_3$ denotes hydrogen and, for the rest, $V_1$ denotes hydrogen, chlorine or alkyl with 1 to 5 carbon atoms, $V_2$ denotes hydrogen, alkyl with 1 to 4 carbon atoms and $V_3$ denotes hydrogen, alkyl with 1 to 12 carbon atoms, cyclohexyl, chlorine, cyanoethyl, alkoxy with 1 to 4 carbon atoms, phenyl, phenylalkyl with 1 to 4 carbon atoms in the alkyl part.

6. A symmetrical bis-benzoxazolyl compound according to claim 1 which correspond to the formula

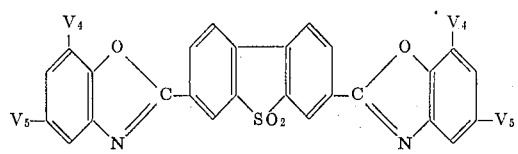

wherein $V_4$ denotes hydrogen or alkyl with 1 to 4 carbon atoms and $V_5$ denotes hydrogen, alkyl with 1 to 12 carbon atoms or phenyl.

7. The compound according to claim 1 which corresponds to the formula

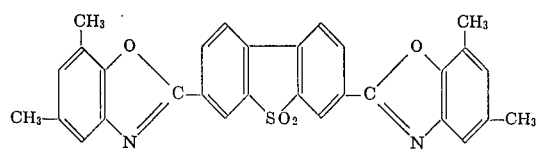

8. The compound according to claim 1 which corresponds to the formula

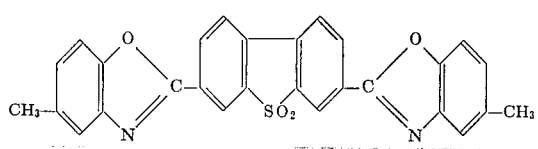

9. A symmetrical compound of the formula

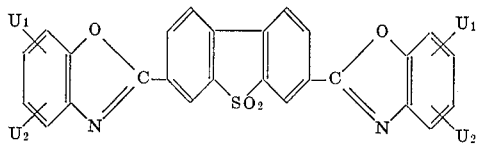

wherein
$U_1$ is hydrogen, alkyl of 1–12 carbon atoms, chlorine, phenylalkyl wherein the alkyl portion contains 1–3 carbon atoms, phenyl and $U_2$ is hydrogen, alkyl of 1–5 carbon atoms or chlorine.

* * * * *